(12) United States Patent
Wilken

(10) Patent No.: US 10,321,390 B2
(45) Date of Patent: Jun. 11, 2019

(54) WIRELESS NETWORK AWARE SELF POINTING ANTENNA

(71) Applicant: Electronic Controlled Systems, Inc., Bloomington, MN (US)

(72) Inventor: Scott Wilken, Eden Prairie, MN (US)

(73) Assignee: Electronic Controlled Systems, Inc., Bloomington, MN (US)

( * ) Notice: Subject to any disclaimer, the term of this patent is extended or adjusted under 35 U.S.C. 154(b) by 0 days.

(21) Appl. No.: 15/242,264

(22) Filed: Aug. 19, 2016

(65) Prior Publication Data

US 2017/0054484 A1    Feb. 23, 2017

Related U.S. Application Data

(60) Provisional application No. 62/207,118, filed on Aug. 19, 2015.

(51) Int. Cl.
*H04W 4/00* (2018.01)
*H04W 48/00* (2009.01)

(52) U.S. Cl.
CPC .................................. *H04W 48/17* (2013.01)

(58) Field of Classification Search
CPC ..... H04W 48/17; H04W 8/183; H04W 48/16; H04W 92/02
See application file for complete search history.

(56) References Cited

U.S. PATENT DOCUMENTS

| | | | |
|---|---|---|---|
| 6,768,897 B1 * | 7/2004 | Suonvieri | H04B 7/15528 455/10 |
| 6,864,846 B2 | 3/2005 | King | |
| 8,941,546 B2 | 1/2015 | King | |
| 2005/0107109 A1 * | 5/2005 | Gunaratnam | H04W 28/12 455/525 |
| 2008/0186242 A1 | 8/2008 | Shuster et al. | |
| 2012/0021690 A1 | 1/2012 | Smith et al. | |
| 2012/0281565 A1 | 11/2012 | Sauer | |
| 2013/0078965 A1 | 3/2013 | Agrawal et al. | |
| 2014/0020060 A1 | 1/2014 | Kotecha et al. | |

OTHER PUBLICATIONS

The International Search Report and the Written Opinion rendered by the International Searching Authority for PCT/US16/047900, dated Oct. 31, 2016, 9 pages.

* cited by examiner

*Primary Examiner* — Stephen M D Agosta
(74) *Attorney, Agent, or Firm* — Skaar Ulbrich Macari, P.A.

(57) ABSTRACT

An antenna system with network awareness includes a control system that points the antenna to a compatible network. The user provides the antenna with an input of a particular wireless service carrier and the control system begins searching for radio frequency signals that indicate the antenna is pointed at a compatible tower. Once a tower is located, the control system reads the carrier identification data transmitted from that tower to determine if the wireless carrier is compatible with the user's service. If an appropriate signal is not found, the control system will continue moving the antenna until another tower is found and the carrier identification information will again be checked. This process is repeated until a compatible tower is identified. Additional iterations can locate additional compatible towers. The antenna can be moved to a final position where the desired network signal is at the highest detected RF power.

20 Claims, 4 Drawing Sheets

WIRELESS NETWORK AWARE SELF POINTING ANTENNA

PRIORITY

This application claims the priority benefit of U.S. Provisional Application No. 62/207,118, filed on Aug. 19, 2015, which is hereby incorporated herein by reference in its entirety.

FIELD

The present invention relates generally to antenna systems for wireless voice and data networks, and more particularly, to an adjustable antenna that is aware of which particular network service provider to which the antenna corresponds.

BACKGROUND

As much as the worldwide proliferation of wireless voice and data networks have expanded to cover many areas where people travel on the planet, there are many fringe areas which suffer from inadequate coverage to maintain a connection, especially inside buildings or vehicles such as automobiles and recreational vehicles.

Products already exist that amplify incoming and outgoing wireless signals to improve coverage in fringe service areas. However these systems require connecting an amplifier to either a low-performance omni-directional antenna, or they count on the user to accurately aim a higher performance directional antenna by hand, which can be difficult.

Conventional signal boosters do not have self-pointing antennas. Instead, they rely on a person turning an antenna manually to find the best signal. Generally, feedback to the user is provided through the presence or absence of a signal on a compatible mobile telephone or data device. Most telephones do not refresh their signal strength displays at a rapid enough rate to enable a user to make antenna adjustments, monitor the phone's signal strength display, and then iterate move/monitoring to find the best antenna orientation. Thus, finding an optimum position can take long periods of time and be very frustrating to the user.

Creating a control system that automatically points the antenna based on signal strength alone is an improvement. The traditional means for automatically pointing an antenna is to monitor radio frequency (RF) power received and make small adjustments to drive mechanisms (motors, linear actuators, etc.) to maximize the RF power measurement and settle on the best pointing direction. However, this is still inadequate because merely monitoring RF power will not indicate which type of network signals are present at a given direction, since only that non-specific magnitude of the radio frequencies are being directionally targeted. There is no means for determining whether the correct signals are being targeted.

For example, in the case of wireless networks with multiple competing (and incompatible) service providers, including but not limited to voice and data service providers on the various GSM, CDMA, EVDO, HSPA+ and LTE bands, it is possible to point the antenna at a strong source of signal without improving actual network connectivity. This is due to the nature of how wireless carriers operate in that it is possible to subscribe to the services offered by one carrier, accidentally point to an antenna tower which only has service from a competing incompatible carrier, and hence never be able to complete a voice or data connection as a result.

Therefore, there remains a need to provide an automatically pointing antenna that addresses some or all of the drawbacks in the prior art.

SUMMARY

The present invention addresses certain deficiencies discussed above by providing network awareness to the control system that points the antenna. The antenna correlates the received RF signal from a cellular network tower to a specific network that is available on that tower and compares that specific network to the network that the user needs to connect with.

According to one disclosed method of operation, the user provides the antenna system with an input of a particular wireless service carrier and the control system will begin searching for radio frequency signals that indicate the antenna is pointed at a compatible tower. Once a tower is located, the antenna pointing control system will read the carrier identification data transmitted from that tower to determine if the wireless carrier the user wishes to connect with is available. If an appropriate signal is not found, the control system will continue moving the antenna until another tower is found and the carrier identification information will again be checked against the carrier of interest. This process will repeat until a compatible tower is identified. Additional iterations can locate additional compatible towers. The antenna would then be moved to a final position where the desired network signal is at the highest detected RF power.

The disclosure also includes a method of locating a wireless telephone data network with an antenna system. The method includes moving an antenna element of the antenna system automatedly in one or more axes. The antenna system samples radio frequency (RF) energy in at least one cellular frequency band while the antenna element is being moved to identify one or more sources of RF energy in the at least one cellular frequency band. While the antenna element is being moved and the RF energy sampled, the antenna system determines whether the RF energy in the at least one cellular frequency band corresponds to a user's cellular service provider network. Position data for the antenna element is stored in memory of the antenna system during the moving step for each instance where the RF energy in the at least one cellular frequency band corresponds to the user's cellular service provider network. Position data can also be stored in memory for each instance where the RF energy in the at least one cellular frequency band does not correspond to the user's cellular service provider network.

The antenna system can determine whether the RF energy in the at least one cellular frequency band is greater than a pre-set threshold before storing the antenna location data. The pre-set threshold can be a dynamic average of a plurality of RF energy measurements.

After the step of moving the antenna element is complete, the antenna element can be automatically positioned using the stored position data to aim at a highest RF power source that corresponds to the user's cellular service provider network.

The RF signal received by the antenna element when the antenna element is aimed at the highest RF power source that corresponds to the user's cellular service provider network can be amplified.

The step of moving an antenna element automatedly in one or more axes can be initiated upon powering the antenna system to ON, or by remote initiation via a user interacting with a smart phone app, or by actuating a switch provided to the antenna system.

The user's cellular service provider network can be automatically identified by a user's smart phone paired to the antenna system, or via an app of a user's smart phone paired with the antenna and wirelessly relaying the user's cellular service provider network from the user's smart phone to the antenna system, or via actuating a switch provided to the antenna system.

The disclosure further includes an antenna system for locating a wireless telephone data network corresponding to a user's cellular service provider network. The antenna system includes a directional antenna element movable in one or more axes, a motor coupled to the antenna element to move the antenna element in one or more axes, a motion controller coupled to the antenna element and the motor, the motion controller comprising a processor and a memory, and a network interface coupled to the motion controller. The network interface is configured to identify a specific cellular service provider network from an RF signal. The motion controller is configured to measure RF energy as the antenna element is moved in one or more axes, determine whether the specific cellular service provider network determined by network interface corresponds to the user's cellular service provider network, store an antenna position data in the memory when the specific cellular service provider network corresponds to the user's cellular service provider network, and use the stored antenna position data to aim the antenna element to a source of the highest RF energy that corresponds to the user's cellular service provider network.

The motion controller can further be configured to store an antenna position data in the memory when the specific cellular service provider network does not correspond to the user's cellular service provider network.

The antenna element, the motor, the motion controller and the network interface can all be disposed entirely within the enclosure. Additionally, an amplifier can be disposed completely inside of the enclosure and coupled to the antenna element and an output port. The output port is accessible from an exterior side of the enclosure.

A software application executing on a smart phone, the smart phone wirelessly paired with the motion controller can supply an identity of the user's cellular service provider network.

The control system can be further configured to allow for either the user to directly terminate the carrier search process, or for search to be terminated based upon other criteria that may be provided. For example, searching can be halted after a predetermined amount of time has elapsed, or halted after the antenna has rotated in one or more complete circles without detecting a compatible signal, etc.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
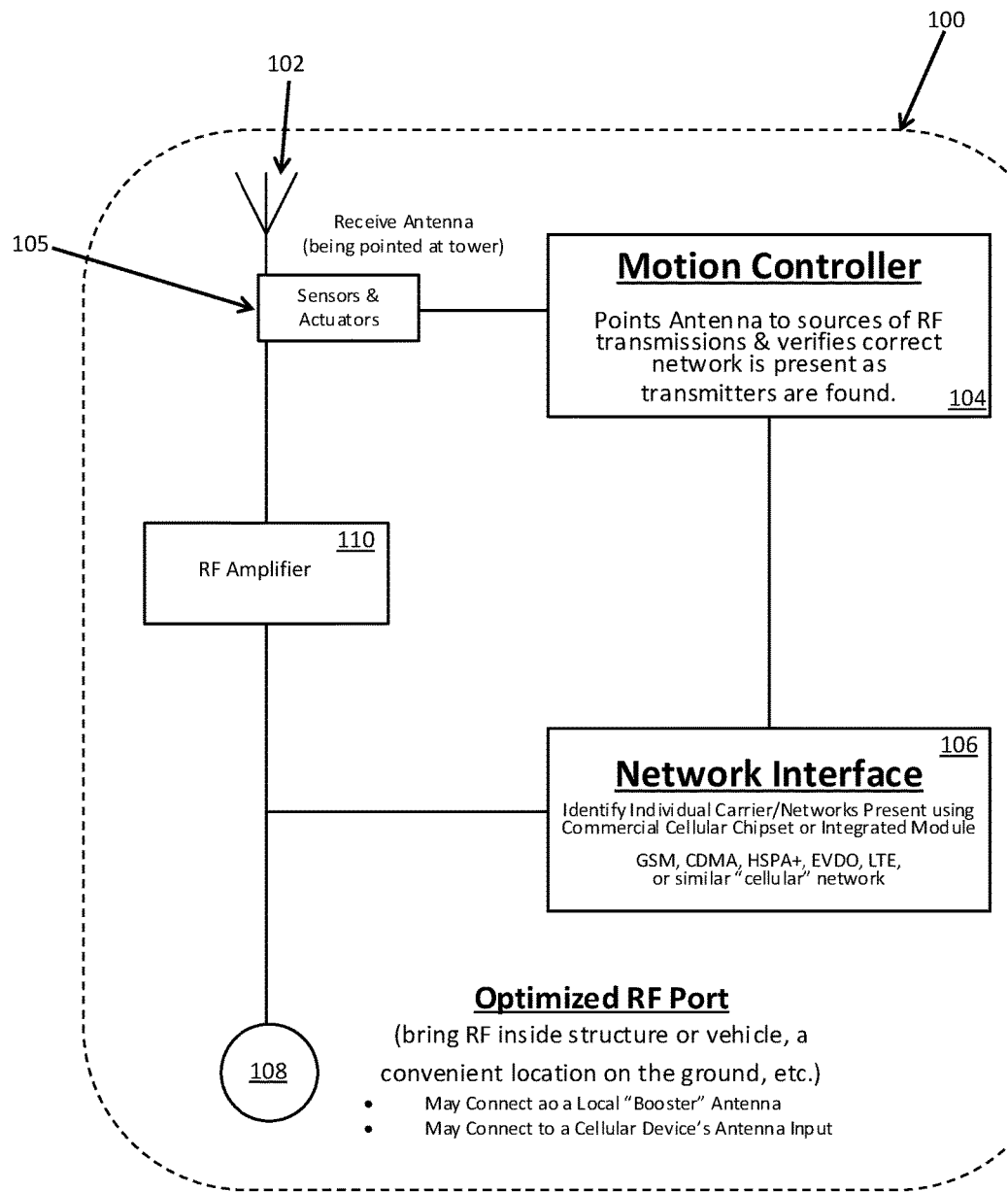
FIG. 1 is an electronics/software block diagram according to certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention.

Referring to FIG. 1, the antenna system 100 generally comprises a signal receiving antenna element 102 appropriate in size and shape to be compatible with the frequency or frequencies of the cellular signal that the user wishes to receive. The antenna element can be any variety, including multiples of 1G, 2G, 3G, 4G/LTE and future mobile communications standards that build on these systems, including LTE Advanced and 5G). The antenna element 102 is preferably a directional antenna. Other types of antennas with directional receiving characteristics (i.e. where gain is not the same in all directions) can also be employed.

The antenna system 100 further includes a motion control subsystem 104 comprising one or more motors or actuators 105, a controller and an RF detector. The motors 105 can be configured to move the antenna in 1, 2 or 3 axes. The RF detector portion of the motion controller 104 discerns the presence of the wireless frequency or frequencies of interest.

The antenna system 100 also includes a network interface 106 coupled to the motion controller subsystem 104. The network interface 106 decodes the carrier network identification from the received RF energy for evaluation by the controller 104. The network interface 106 includes chipsets that are compatible with the network(s) that the user wishes to access, plus any other network(s) that the antenna is configured to recognize. Thus, the user can manually switch the antenna to recognize any one of a variety of network service providers. Alternatively, the antenna system can include only one chipset and recognize only one service provider.

The controller of the motion controller electronics 104 comprises a microprocessor and non-transitory memory. Software code is stored in the memory and executed by the processor such that the motion controller 104 selectively operates the motors or actuators 105 connected to the antenna element(s) 102 to aim the antenna element(s) based upon information from the RF detector and the RF network chipset of the network interface 106 that decodes the carrier identification data transmitted from the broadcast towers.

The output of the antenna system at the "optimized RF port" 108 can be connected to a variety of devices, including a signal "booster" amplification device 110, a repeater antenna, a wireless router providing network connections to local devices, a wireless handset, or similar devices operating on a 1G/2G/3G/4G/LTE/etc. mobile network. The amplifier 110 can also be included within the antenna system 100, as shown in FIG. 1, so that the output at the port 108 is amplified.

Power for the antenna system can be provided by a variety of available sources, including solar cells coupled to the antenna, by a power input line, onboard batteries, generator, or other type of fuel cell. The power input line can be public grid power, or power supplied from any external source such as a vehicle. The power source can include both alternating current (AC) and direct current (DC) types.

Figure 2:
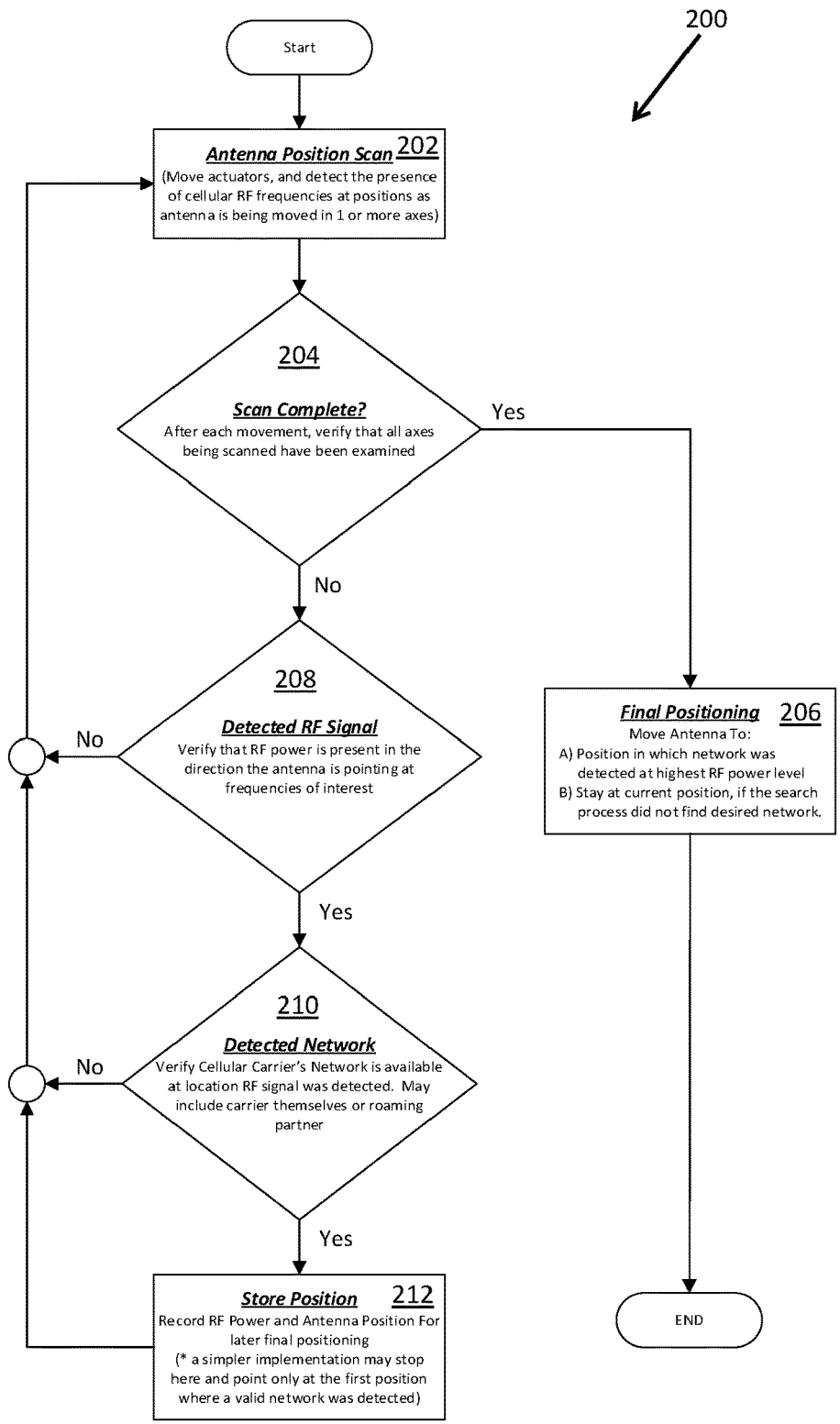
FIG. 2 is an algorithm flowchart for detecting signal with network awareness according to certain example embodiments.

FIG. 2 provides an operational algorithm 200 for aiming the antenna system. Software code is stored in memory to control the operation according to the indicated algorithm. Data, such as antenna element position (or orientation) is stored in the memory as well.

Referring to FIG. 2, in step 200 an antenna position scan routine 202 is performed. This routine moves the antenna element, via the motors or actuators, in one or more axes while sampling the RF energy in the common cellular frequency bands. While the scan is progressing (i.e. not yet complete as determined in step 204), the detected RF power, if any, is noted in step 208. Additionally while the scan is progressing, step 210 evaluates whether the user's selected service provider matches the service provider of the detected RF signal in step 208. If steps for RF detection 208 and network detection 210 produce positive results, then the antenna position for the detected RF signal is stored in memory in step 212. Once the scan is determined to be complete 204, then the final position of the antenna 206 is performed. In final positioning, the antenna element is oriented or aimed to either (a) the position in which the user's selected network was detected at the highest RF power, or (b) the current position (i.e. does not move) if no compatible RF signals were located.

The storing of position data provides the benefit of avoiding repeated aiming at a source already determined to be non-compatible. This can be implemented by skipping the stored "bad" positions on subsequent searches.

Additional data can also be stored in memory, including RF power and the antenna positions for networks detected at stored previous antenna positions, both conforming to the user's network (i.e. good) and non-conforming to the user's network (i.e. bad). Stored RF power levels can be used to establish a dynamic floor (dynamic average or threshold) for finding RF hotspots of interest as part of searching algorithm. Stored "good" locations can aid in re-locating a previous target location of interest.

For example, the floor can be applied in step 208 of FIG. 2 so that only positions corresponding to RF signals above the dynamic floor are stored in step 212.

The user's network can be chosen by provision of a physical or electronic switch on an exterior of the antenna system, or at a remote position convenient to the user.

Figure 3:
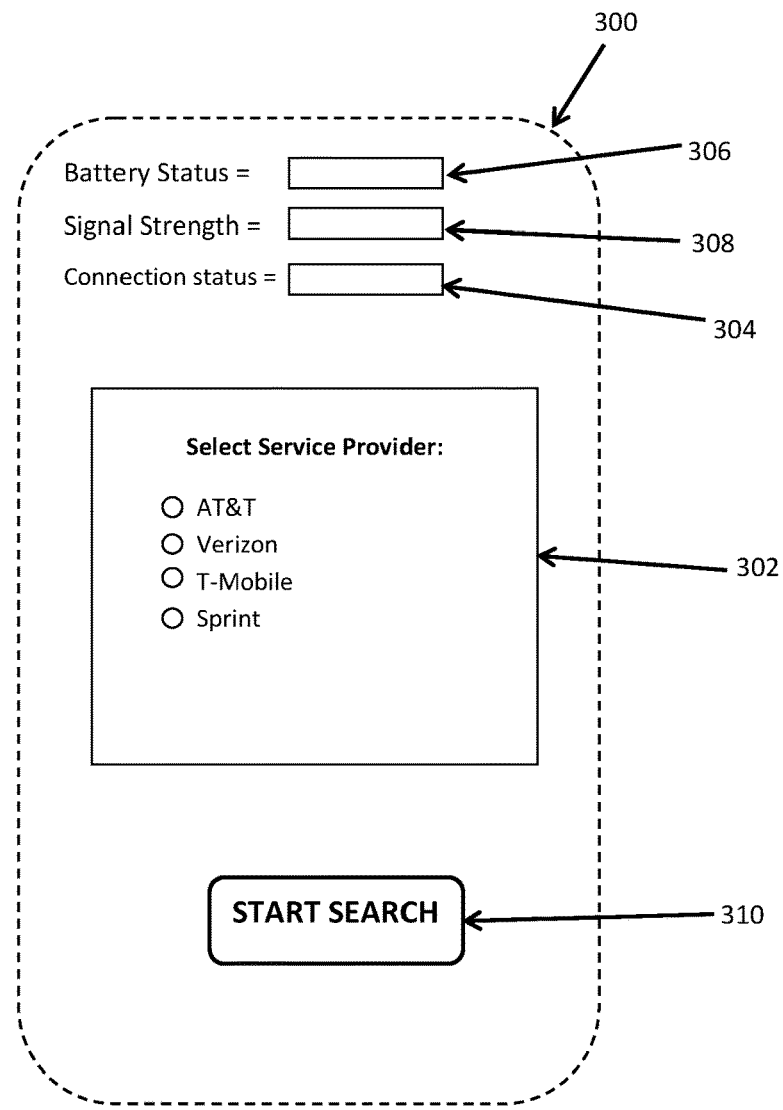
FIG. 3 is an illustration of a smart phone screen shot according to certain example embodiments.

The motion controller subsystem can also include a wireless communications component (e.g. Bluetooth, Wi-Fi, ZigBee, other) to enable the antenna system to communicate with the user's smartphone. This allows the user to control the antenna with a smartphone app stored on the user's smartphone. An example of a screen 300 of an app where the user inputs their particular network service provider 302 is shown in FIG. 3.

The antenna system can also provide the user with feedback such as connection status 304, operating power level (e.g. battery power) 306, and a visual signal strength display 308 via the smartphone's display 300. The user can initiate a search 310 by pressing the "start search" option on the screen.

Wired connections between the antenna system and the smartphone can be provided in addition to, or in the alternative to, wireless connections.

Smartphones generally know the identity of the network they are assigned to, so the smartphone app can also be configured to automatically relay to the control system what network the antenna should look for, thereby eliminating the need for the user to manually input their network.

The search process can be initiated by the user pressing the start search button 310 on their smartphone app or by pressing a button provided on a housing of the antenna system (e.g. either a "search button" or by pressing and holding the "on" button for more than a few seconds). Alternatively, the antenna system can be configured to automatically perform a search upon being powered on.

Figure 4:
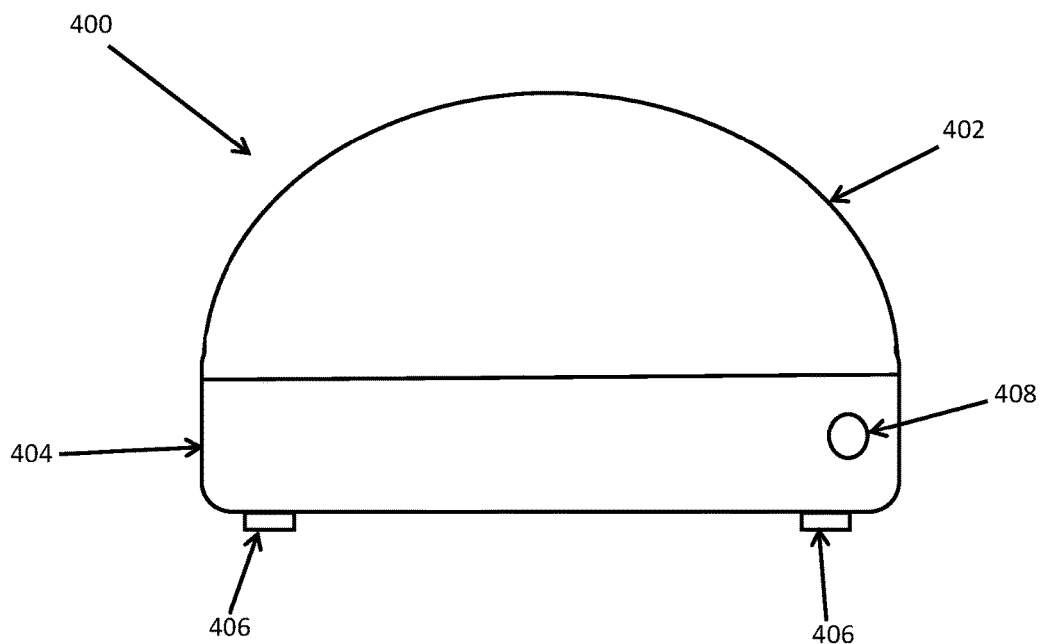
FIG. 4 is a side view of an antenna system according to certain example embodiments.

Referring to FIG. 4, the antenna system components, or portions thereof, can be surrounded by a housing or enclosure 400 to protect the components from contaminants, moisture, impacts, and other hazards to electrical components. The enclosure 400 can be dielectric and is preferably made out of an ultra-violet protected lightweight plastic or other electromagnetic wave permeable material.

The enclosure 400 can include a base 402 with a removable cover 404. A plurality of feet 406 can protrude downward from the enclosure to facilitate mounting on a surface or in a bracket. The feet can also be rubber or other material that will grip a surface that the enclosure is sitting on. An input or output port 408 is shown in the base of the enclosure. Additional input and output ports can be included for connection to power, repeater antennas, coaxial cables, etc. Wireless communication components can be located inside of the enclosure to enable wireless connection with the user's smartphone.

The antenna system of the present invention provides convenient improvement of the reception signal for wireless devices by including a far higher gain antenna than that of the user's personal device, such as a smartphone, while making the aiming process easier for the user. It is also possible to place the antenna system in a location with a better line-of-sight to a tower, such as on a rooftop of a vehicle or building, on a pole, etc.

The present invention also prevents locking onto incorrect or incompatible RF sources. Previous methods for automatically pointing antennas use the presence of RF power at the frequencies of interest to indicate that a signal has been found and locks the antenna in the proper direction. With cellular class signals specifically, this method is insufficient since it is possible that a pointing system detecting only RF power will point at an antenna tower that does not have service for the network to which the system's user subscribes. For instance, a one example approach may find the most powerful tower available that happens to have service for AT&T's 3G service. A person subscribing to T-Mobile's service may in fact have a mobile handset that is compatible with the signals that the automatic pointing system located, but since the user subscribes to T-Mobile's network, their handset may still be unable to establish any connection.

The present invention electronically monitors the presence of raw RF signal at the frequencies of interest to determine if an improved connection might be made in the same way traditional automatic antenna pointing systems might work. It addresses the second problem of finding a compatible network by having its own on-board cellular networking components so that it may read the carrier ID's available on a given tower and ensure that the system points only at towers for which the user may actually establish a connection at the network layer, rather than simply seeing an otherwise compatible RF signal.

In an alternative embodiment, the control system can access the broadcast tower information by way of a pre-loaded database and then determine the location of the antenna's location through a means like Global Positioning System or GLONASS as well as the direction that the antenna is pointing using a device like a magnetometer. The location and heading components can be disposed within the antenna housing or can be acquired from the smartphone via the phone app and transmitted to the antenna controller via Bluetooth connection.

This method allows the antenna to indirectly determine that it is pointing at a valid tower without needing to decode the carrier identification information. Updates to the database of tower information can be performed via the smartphone app and Bluetooth connection.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of locating a wireless telephone data network with an antenna system, the method comprising:
   performing an antenna position scan routine, the scan routine comprising:
      moving an antenna element of the antenna system automatically in one or more axes;
      sampling radio frequency (RF) energy by the antenna system in at least one cellular frequency band while the antenna element is being moved to identify one or more sources of RF energy in the at least one cellular frequency band;
      while the antenna element is being moved and the RF energy sampled, determining by the antenna system whether the RF energy in the at least one cellular frequency band corresponds to a user's cellular service provider network;
      while the antenna element is being moved and the RF energy sampled, determining by the antenna system whether the RF energy in the at least one cellular frequency band is greater than a pre-set threshold, wherein the pre-set threshold is a dynamic average of a plurality of RF energy measurements; and
      storing a position data for the antenna element in a memory of the antenna system during the moving step for each instance where the RF energy in the at least one cellular frequency band corresponds to the user's cellular service provider network; and
   after completion of the scan routine, moving the antenna element to automatically position the antenna element using the stored position data to aim at a highest RF power source that corresponds to the user's cellular service provider network.

2. The method of claim 1, further comprising amplifying an RF signal received by the antenna element when the antenna element is aimed at the highest RF power source that corresponds to the user's cellular service provider network.

3. The method of claim 1, wherein the antenna element is a directional antenna element.

4. The method of claim 1, wherein the step of performing the antenna position scan routine is initiated upon powering the antenna system to ON.

5. The method of claim 1, wherein the step of performing the antenna position scan routine is initiated remotely via a user interacting with a smart phone app.

6. The method of claim 1, wherein the step of performing the antenna position scan routine is initiated by actuating a switch provided to the antenna system.

7. The method of claim 1, further comprising displaying on a graphical user interface of a smart phone a network connection status indicia.

8. The method of claim 1, wherein the antenna element of the antenna system is moved automatedly in one or more axes by one or more motors.

9. The method of claim 1, further comprising automatically identifying the user's cellular service provider network by a user's smart phone paired to the antenna system.

10. The method of claim 1, further comprising identifying the user's cellular service provider network via an app of a user's smart phone and wirelessly relaying the user's cellular service provider network from the user's smart phone to the antenna system.

11. The method of claim 1, further comprising actuating a switch provided to the antenna system to identify the user's cellular service provider network.

12. The method of claim 1, further comprising storing a position data for the antenna element in a memory of the antenna system during the moving step for each instance where the RF energy in the at least one cellular frequency band does not correspond to the user's cellular service provider network.

13. An antenna system for locating a wireless telephone data network corresponding to a user's cellular service provider network, the antenna system comprising:
   a directional antenna element movable in one or more axes;
   a motor coupled to the antenna element to move the antenna element in one or more axes; and
   a motion controller coupled to the antenna element and the motor, the motion controller comprising a processor and a memory,
   wherein the motion controller is configured to:
      measure RF energy as the antenna element is moved in one or more axes,
      determine whether the specific cellular service provider network determined by network interface corresponds to the user's cellular service provider network, store an antenna position data in the memory when the specific cellular service provider network corresponds to the user's cellular service provider network, use the stored antenna position data to aim the antenna element to a source of the highest RF energy that corresponds to the user's cellular service provider network, and obtain an identity of the user's cellular service provider network from a smart phone paired with the motion controller.

14. The system of claim 13, further comprising an enclosure, wherein the antenna element, the motor, the motion controller and the network interface are all disposed entirely within the enclosure.

15. The system of claim 14, further comprising an amplifier disposed completely inside of the enclosure and coupled to the antenna element and an output port, the output port accessible from an exterior side of the enclosure.

16. The system of claim 13, wherein the motion controller is further configured to store the antenna position data in the memory when the specific cellular service provider network does not correspond to the user's cellular service provider network.

17. An antenna system for locating a wireless telephone data network corresponding to a user's cellular service provider network, the antenna system comprising:

a directional antenna element movable in one or more axes;

a motor coupled to the antenna element to move the antenna element in one or more axes; and a motion controller coupled to the antenna element and the motor, the motion controller comprising a processor and a memory, wherein the motion controller is configured to:

measure RF energy as the antenna element is moved in one or more axes, determine whether the specific cellular service provider network determined by network interface corresponds to the user's cellular service provider network, determine whether the RF energy being measured is greater than a pre-set threshold, wherein the pre-set threshold is a dynamic average of a plurality of RF energy measurements, store an antenna position data in the memory when the specific cellular service provider network corresponds to the user's cellular service provider network, and use the stored antenna position data to aim the antenna element to a source of the highest RF energy that corresponds to the user's cellular service provider network.

18. The system of claim 17, wherein the motion controller is further configured to store the antenna position data in the memory when the specific cellular service provider network does not correspond to the user's cellular service provider network.

19. The system of claim 17, wherein the motion controller is further configured to store the antenna position data in the memory when the RF energy being measured is also greater than the pre-set threshold.

20. The system of claim 17, further comprising a network interface coupled to the motion controller, the network interface configured to identify a specific cellular service provider network from an RF signal.

* * * * *